Patented Oct. 12, 1954

2,691,607

UNITED STATES PATENT OFFICE 2,691,607

COVERED CONDUCTORS AND METHODS FOR MAKING SAME

Mortimer T. Harvey, South Orange, N. J., assignor to Harvel Research Corporation, a corporation of New Jersey No Drawing. Application March 12, 1952, Serial No. 276,217

8 Claims. (Cl. 117—128.4)

This invention relates to novel compositions of matter and to methods for preparing them and also to articles of manufacture produced therewith. More particularly, the invention is directed to combining with rubbery materials certain other materials to provide compositions which in certain respects are superior to products produced with only the rubbery materials themselves. In its more specific aspect, the invention is directed to electrical conductors and especially those of great length which, for example, may be in the form of wires, stranded wires or cables carrying protective or insulation coverings which may be in the tubular state and produced by extrusion on the electrical conductor.

The rubbery materials, which may be employed alone or in combination of two or more of them as a starting component of this invention, are natural rubber, rubbery polymers of chloroprene sometimes known commercially as "Neoprene," or "GR–M," rubbery copolymers of butadiene and styrene sometimes known as "Buna S," and rubbery copolymers of butadiene and acrylonitrile sometimes known as "Buna N."

I have discovered that some of the characteristics and particularly the oil resistance and ozone resistance of said rubbery materials after curing may be appreciably enhanced by first combining therewith one or a combination of two or more products which I shall hereinafter refer to as FKS products and are as follows: (a) sulphurized organic reaction products of furfuraldehyde and a ketone such as acetone, mesityl oxide, acetonyl acetone and di acetone alcohol. Said organic reaction products are produced by reacting under alkaline conditions furfuraldehyde with one or more of said ketones and said sulphurized furfuraldehyde-ketone reaction products in general having combined therewith 1–30 parts by weight of sulphur to 100 parts by weight of the furfuraldehyde-ketone reaction product; (b) products produced by combining (a) with (c) a normally solid vinyl compound selected from the group consisting of polymerized vinyl esters, such as polyvinyl chloride, polyvinyl acetate, etc., polymerized vinyl acetals such as polyvinyl formal, polyvinyl butyral, polyvinyl acetals, etc., copolymers of vinyl esters such as copolymers of vinyl acetate and vinyl chloride and copolymers of vinyl chloride and vinylidene chloride as well as mixtures thereof, with the ratio by weight of (a) to (c) being generally 130 parts of the former to 15–65 parts of the latter. The various FKS products, namely products (a) and products (b), employed in the practice of this invention as well as the general methods for producing them are described in columns 1 and 2 and in the first 45 lines of column 3 of my Patent 2,545,461 issued on March 20, 1951, and in its entirety made part hereof; also reference is hereby made to products S–1, S–2, S–3, SV–1, SV–2, SV–3, SA—SF and SV products of example SV–4, all, as well as the methods for preparing them, being specifically described in said patent.

Briefly, according to this invention, 5–200 parts and preferably 5–100 parts by weight of one or a combination of two or more of said FKS products is combined with 100 parts by weight of one or a combination of two or more of said rubbery materials. The combining of said components may be effected by cool-milling on a rubber mill or in a Banbury mixer. Also added to said materials in the course of the combining of these two essential components are any desired fillers, vulcanizates, etc., which may be found desirable. Then the mix which has been milled to homogeneity may be extruded in tubular form directly onto an electrical conductor and subsequently cured to provide protective coverings of enhanced oil and ozone resistance for said conductors. The following examples set forth various illustrative compositions of this invention.

General example

Place 100 parts of said rubbery material on the rubber mill and mill it until it is sufficiently broken down. Then various fillers, antioxidants and vulcanizates, etc., are added and mill-blended for homogeneity. Then 5–200 parts of a FKS product is added and the entire mass further milled to homogeneity. Then accelerator is added and also mill-blended and the entire mass may be sheeted at the desired thickness and then extruded in tubular form onto an electrical conductor and then cured.

Instead of employing the rubber mill method, the Banbury mill method may be used for blending the various components.

Example N—S 100 parts of "Hycar DR–25", which is a "Buna N", is milled on a rubber mill. Then further milled while there is being added thereto the following materials in the sequence set forth: 1 part stearic acid, 5 parts zinc oxide, 75 parts of "SRF black" (carbon black), 50 parts of sulphurized furfuraldehyde-ketone, such as Product S–1, S–2, S–3, or SA—SF, produced by methods set forth in Examples S–1, S–2, S–3, or S–4 of said aforeidentified patent, and finally a vulcanizate, 2 parts of sulphur, and 1.5 parts of accelerator, benzothiazyldisulphuride are blended therein. Then the homogeneous, millable, rubbery mass is sheeted, extruded in tubular form onto an electrical conductor and cured 10–60 minutes at temperatures from 340–290° F. The cured product in which the conductor is encased will have enhanced oil and ozone resistance when compared with a product of comparable compositions and having none of S–1, S–2, S–3 or SA—SF product present.

*Example N—VS*

Employ the same procedure as that set forth in Example N—S except that in place of the S–1, S–2, S–3 or SA—SF products there is substituted 100 parts of sulphurized (furfuraldehyde-ketone) combined with vinyl compounds and may be Products SV–1, SV–2 or SV–3 of Examples SV–1, SV–2 and SV–3, or an SV product of Example SV–4 of said patent. The cured tubular covering will also have enhanced oil and ozone resistance.

*Example S—S*

100 parts of "SP–65", a type of "Buna S", is cool-milled on a rubber mill. Then further milled while added thereto in the following sequence are 1 part stearic acid, 5 parts zinc oxide, 75 parts "SRF black", 30 parts of Product S–1, S–2, S–3 or SA—SF. Then add 2 parts sulphur and 1.5 parts of mercaptobenzothiazole, further mill, then sheet and extrude onto the conductor. The cured tubular covering will have high oil and ozone resistance.

*Example S—VS*

Employ the same procedure as set forth in Example S—S except that in place of the S–1, S–2, S–3 or SA—SF there is substituted 75 parts of SV–1, SV–2, SV–3 or SV products of Example SV–4. The cured tubular covering has enhanced oil and ozone resistance.

*Example M—S*

100 parts of "Neoprene GN", which is a "GRM", is cool-milled on a rubber mill. Then further milled while there is being added thereto in the following sequence: 0.5 part stearic acid, 2 parts phenyl-beta-naphthylamine, 50 parts "SRF black", 10 parts S–1, S–2, S–3 or SA—SF, then 5 parts zinc oxide and 4 parts magnesium oxide are added, further mill, extrude onto the conductor and cure. The cured tubular covering has enhanced oil and ozone resistance.

*Example M—VS*

Employ the same procedure as set forth in Example M—S except that in place of the S–1, S–2, S–3 or SA—SF products, substitute 30 parts of SV–1, SV–2, SV–3 or SV products of Example SV–4. The cured tubular cover has enhanced oil and ozone resistance.

Test of samples of the cured stocks were as follows:

Cured stock made as set forth in Examples N—VS, S—VS and M—VS were respectively compared with cured stocks using the same materials and procedures as therein set forth except that no SV material was used therein and these stocks are respectively known as N, S and M. All of said stocks were cut to provide strips measuring approximately .5 inch wide, 6 inches long and .08 inch thick. Each was placed in an atmosphere of ozone and allowed to remain there while under a tension of approximately 50% elongation and the time of initial cracking was observed and found to be:

N, cracked in 1 minute
N—VS, cracked in 119 minutes
S, cracked in 1 minute
S—VS, cracked in 50 minutes
M, cracked in 22 minutes
M—VS, no cracking observed and tests discontinued at 2000 minutes.

I have also discovered that said FKS products may be modified by combining them with styrene and such modified FKS products may be substituted for all or a part of said FKS products with said rubbery materials as hereinbefore set forth.

One of the methods which may be employed to combine the styrene with a FKS product, such as (a) is to first polymerize the styrene until its viscosity is 2,000–6,000 centipoises at 25° C. Then a product as defined in (a), examples of which are Products S–1, S–2, S–3 and SA—SF shown in said patent, is added to the polymerized styrene, employing 5–100 parts by weight of polystyrene to 100 parts of (a). The mass is heated at 100–150° C. for solution. Such combinations represent a class of materials which may be combined with the various rubbery materials as before set forth.

In the production of the products as shown in Examples SV–1, SV–2, SV–3 and SV product of Example SV–4, there also may be added at the same time the normally solid polymer or copolymer is added, approximately 10 parts of styrene or polystyrene or the styrene or polystyrene may replace all or part of said polymers or copolymers in said examples, to provide novel compositions which also may be combined with said rubbery materials.

100 parts of butadiene may be in the liquid state in a jacketed closed vessel equipped for stirring, and there is mixed therewith 25 parts of Product S–1, S–2, S–3, or SA—SF, SV–1, SV–2, SV–3 or SV–4, with or without 25 parts of styrene or polystyrene. This mix is emulsified in a soap solution to provide 20 parts of the mass in 80 parts of the soap solution. Then add while agitation is maintained benzoyl peroxide and heat to 35–80° C. and hold for 16–48 hours. Add acetic acid to break emulsion whereupon coagulation takes place and this coagulant is also suitable for combination with the rubbery materials by milling.

I claim:

1. An electric conductor carrying in insulation therearound, said insulation comprising a cured composition comprising (I) a rubbery material selected from the group consisting of (a) natural rubber, (b) rubbery polymers or chloroprene, (c) rubbery copolymers of butadiene and styrene and (d) rubbery copolymers of butadiene and acrylonitrile, and (II) a material selected from the group consisting of (e) sulphurized furfuraldehyde-ketone reaction products and (f) said sulphurized product combined with a normally solid vinyl compound selected from the group consisting of polymerized vinyl esters, polyvinyl acetals, and copolymers of vinyl esters.

2. An electric conductor carrying a cured insulation comprising a rubbery polymer of chloroprene and sulphurized furfuraldehyde-ketone reaction product.

3. An electric conductor carrying a cured insulation comprising a rubbery polymer of chloroprene and sulphurized furfuraldehyde-ketone reaction product combined with a copolymer of vinyl chloride and vinyl acetate.

4. An electric conductor carrying a cured insulation comprising a rubbery copolymer of butadiene and styrene and sulphurized furfuraldehyde-ketone reaction product.

5. An electric conductor carrying a cured insulation comprising a rubbery copolymer of butadiene and styrene and sulphurized furfuraldehyde-ketone reaction product combined with a copolymer of vinyl chloride and vinyl acetate.

6. An electric conductor carrying a cured insulation comprising a rubbery copolymer of butadiene and acrylonitrile and sulphurized furfuraldehyde-ketone reaction product.

7. An electric conductor carrying a cured insulation comprising a rubbery copolymer of butadiene and acrylonitrile and sulphurized furfuraldehyde-ketone reaction product combined with a copolymer of vinyl chloride and vinyl acetate.

8. The method comprising extruding onto an electrical conductor a composition including (I) a rubbery material selected from the group consisting of (a) natural rubber, (b) rubbery polymers of chloroprene, (c) rubbery copolymers of butadiene and styrene and (d) rubbery copolymers of butadiene and acrylonitrile, and (II) a material selected from the group consisting of (e) sulphurized furfuraldehyde-ketone reaction products and (f) said sulphurized product combined with a normally solid vinyl compound selected from the group consisting of polymerized vinyl esters, polyvinyl acetals, and copolymers of vinyl esters.

References Cited in the file of this patent

UNITED STATES PATENTS

| Number | Name | Date |
|---|---|---|
| 2,281,375 | Nowalk | Apr. 28, 1942 |
| 2,484,705 | Gray | Oct. 11, 1949 |
| 2,545,461 | Harvey | Mar. 20, 1951 |